Patented Dec. 16, 1952

2,622,014

UNITED STATES PATENT OFFICE 2,622,014

METHOD FOR PREPARING BORON TRIFLUORIDE

Isidor Kirshenbaum, New York, N. Y., assignor to the United States of America as represented by the United States Atomic Energy Commission No Drawing. Application April 25, 1946,
Serial No. 664,964

4 Claims. (Cl. 23—205)

1

The present invention relates to a method for preparing boron trifluoride.

An object of the invention is to provide a method for making boron trifluoride from an oxide of boron.

Another object is to provide a method of making boron trifluoride from a boric oxide.

A specific object of the invention is to provide a method for preparing boron trifluoride from an oxide of boron without changing the distribution of isotopes found in the oxide.

The above and other objects will become apparent in the course of the following description.

It is desirable for certain purposes to have a means for preparing small quantities of boron trifluoride. One such case occurs in the analysis of an oxide of boron to determine its proportion of boron isotopes. The analysis for isotopes is most conveniently carried out using a volatile boron compound of which boron trifluoride is a particularly suitable compound. The primary requirement of a method of making boron trifluoride for the purpose of isotope analysis is of course that the method does not change the naturally occurring distribution of isotopes in the boron source compound. Small quantities of boron trifluoride may also be desired for use as reactants, catalysts, or promoters in small scale chemical operation. The invention is equally suitable for all of these purposes.

In accordance with the present invention it has been found that boron trifluoride can be prepared by reacting an oxide of boron with a metallic fluorinating agent. The most convenient boron compound to use is boric oxide, $B_2O_3$. Boric acid can be used but preferably is dehydrated to the oxide before bringing into contact with the fluorinating agent. The preferred fluorinating agent is cobalt trifluoride, although any metallic fluorinating agent such as antimony pentafluoride, mixtures of antimony trifluoride and antimony pentachloride, mercuric fluoride or argentic fluoride ($AgF_2$) can also be used. The reaction should be performed in the absence of water. Desirably the reactants are brought together in proportions giving a large excess of the fluorinating agent over the stoichiometric quantity required to convert the boron compound to boron trifluoride. The reactants are then heated to a temperature depending on the activity of the particular fluorinating agent used. Boron trifluoride is evolved as a gas and is collected by freezing in a cold trap or by other suitable means. In the preferred case using boric oxide and cobalt trifluoride the proportions of reactants should be such as to provide ten or more parts by weight of cobalt trifluoride per part of boric oxide. Much larger excesses of cobalt trifluoride can be used without interfering with the reaction. The reactants can be mixed together in the dry state or they can be packed in separate superimposed layers in a reaction vessel. The reaction of cobalt trifluoride and boric oxide proceeds at an appreciable rate at temperatures of about 115° C. or higher. Preferably the temperature will be carried to a maximum of 175° C. to 190° C. The reaction is favored by reduced pressures although it is not essential to operate under this condition.

Example

A layer of cobalt trifluoride was placed on a bottom of a reaction vessel. This layer was covered with a layer of boric oxide and a second layer of cobalt triffuoride was placed over the boric oxide. The proportions were such as to provide about twenty parts by weight of cobalt trifluoride to one part of boric oxide. The reaction vessel was connected to a cold trap for the collection of gas. The reactants were then heated slowly to raise the temperature to 180° C. It was observed that reaction started at 115° C. and became more vigorous as the higher temperature was approached. Heating was continued as long as the reaction appeared to continue. During this time boron trifluoride was evolved as a gas and was collected by freezing in the cold trap. The yield of boron trifluoride collected amounted to 41.5 per cent based on the boric oxide used.

The boron trifluoride was subjected to analysis by mass spectrometer for identification and to establish the proportion of the boron isotopes. In this way it was determined that the proportion of boron isotopes was unchanged by comparison with the proportion found in the boric oxide used.

Since many embodiments might be made of the present invention and since many changes might be made in the embodiment described, it is to be understood that the foregoing description is to be interpreted as illustrative only and not in a limiting sense.

I claim:

1. The method for preparing boron trifluoride which comprises heating together at substantially atmospheric pressure in an essentially dry, solid condition and at a temperature of from 115° C. to 190° C. an oxide of boron and a metallic fluorinating agent selected from the group consisting of cobalt trifluoride, antimony pentafluoride, mixtures of antimony trifluoride and antimony pentafluoride, mercuric fluoride and argentic fluoride, and collecting the boron trifluoride gas evolved.

2. The method for preparing boron trifluoride which comprises heating together at substantially atmospheric pressure in an essentially dry, solid condition and at a temperature of from 115° C. to 190° C. an oxide of boron and cobalt trifluoride, and collecting the boron trifluoride gas evolved.

3. The method for preparing boron trifluoride which comprises heating together at substantially atmospheric pressure in an essentially dry, solid condition and at a temperature of from 115° C. to 190° C. boric oxide and cobalt trifluoride, and collecting the boron trifluoride gas evolved.

4. The method for preparing boron trifluoride which comprises heating together at substantially atmospheric pressure, in an essentially dry, solid condition boric oxide and a stoichiometric excess of cobalt trifluoride at a temperature of from 115° C. to 190° C., and collecting the boron trifluoride gas evolved.

ISIDOR KIRSHENBAUM.

REFERENCES CITED

The following references are of record in the file of this patent:

UNITED STATES PATENTS

| Number | Name | Date |
|---|---|---|
| 1,865,204 | Otto | June 28, 1932 |
| 1,898,532 | Hardtmann | Feb. 21, 1933 |
| 2,163,232 | Baldeschwieder | June 20, 1939 |

OTHER REFERENCES

Mellor, Inorganic and Theoretical Chemistry, vol. 5, Longmans, Green and Co., N. Y. (1924), pp. 43 and 121.